United States Patent
Haider et al.

(10) Patent No.: US 6,780,957 B1
(45) Date of Patent: *Aug. 24, 2004

(54) HYDROPHOBIC LIGHT STABLE POLYURETHANE ELASTOMER WITH IMPROVED MECHANICAL PROPERTIES

(75) Inventors: Karl W. Haider, McKees Rocks, PA (US); Jack C. Chan, Coraopolis, PA (US); E. Haakan Jonsson, Fairfield, OH (US); Uli W. Franz, Coraopolis, PA (US); Ronald P. Taylor, Moon Township, PA (US)

(73) Assignee: Bayer Polymers LLC, Pittsburgh, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/474,114

(22) Filed: Dec. 29, 1999

(51) Int. Cl.$^7$ .................... C08G 18/62; C08G 18/10; C08G 18/32; C08G 18/75
(52) U.S. Cl. .................... 528/61; 528/64; 528/65; 528/66; 528/67; 528/75; 528/85
(58) Field of Search .................... 528/61, 64, 65, 528/66, 67, 75, 85

(56) References Cited

U.S. PATENT DOCUMENTS

| | | | |
|---|---|---|---|
| 4,741,961 A | 5/1988 | Frisch et al. | 428/412 |
| 5,247,023 A | 9/1993 | Chung et al. | 525/288 |
| 5,403,904 A | 4/1995 | Nubel et al. | 526/139 |
| 5,512,635 A | 4/1996 | Nubel et al. | 525/247 |
| 5,519,101 A | 5/1996 | Nubel et al. | 526/142 |
| 5,559,190 A | 9/1996 | Nubel et al. | 525/270 |
| 5,589,543 A * | 12/1996 | Yokelson et al. | 525/131 |
| 5,750,815 A | 5/1998 | Grubbs et al. | 585/511 |
| 6,166,166 A * | 12/2000 | Taylor et al. | 528/65 |
| 6,211,324 B1 * | 4/2001 | Haider et al. | 528/65 |

FOREIGN PATENT DOCUMENTS

EP 414375 2/1991

OTHER PUBLICATIONS

Journal of Applied Polymer Science, US, John Wiley and Sons Inc., New York, vol. 64, No. 6, May 9, 1997, pp. 1235–1245, XP000802660, ISSN: 0021–8995, p. 1236, Column 2, Line 12–24, Shih–Liang Huang et al., "Tensile Property of Modified Hydroxyl–Terminated Polybutadiene–Based Polyurethanes".

* cited by examiner

*Primary Examiner*—Rabon Sergent
(74) *Attorney, Agent, or Firm*—Joseph C. Gil; John E. Mrozinski, Jr.

(57) ABSTRACT

A hydrophobic polyurethane elastomer is disclosed comprising an isocyanate terminated prepolymer having an isocyanate content ranging from 4 to 12 wt. % NCO comprising the reaction product of: i) an OH terminated homopolymer of butadiene having molecular weight ranging from 1000 to 4000 and an OH functionality of from 1.9 to 2.1; ii) an aliphatic or cycloaliphatic diisocyanate; and a diol chain extender having a molecular weight ranging from 62 to 400.

12 Claims, No Drawings

HYDROPHOBIC LIGHT STABLE POLYURETHANE ELASTOMER WITH IMPROVED MECHANICAL PROPERTIES

FIELD OF THE INVENTION

The present invention relates to a hydrophobic polyurethane elastomer prepared by combining a polybutadiene diol and an aliphatic or cycloaliphatic diisocyanate to form an isocyanate terminated prepolymer and chain extending the prepolymer with a diol.

BACKGROUND OF THE INVENTION

It is well known to prepare isocyanate terminated polyurethane prepolymers from polyether and/or polyester polyols and aromatic diisocyanates. Furthermore, it is also well known to prepare polyurethane elastomers by chain extending these prepolymers with low molecular weight diols. The resulting polyurethanes have excellent mechanical properties, but are rather hydrophilic, which can limit their utility in certain moisture sensitive applications.

Hydroxyl terminated polyols with very non-polar backbones (e.g., hydroxyl functional polybutadiene) can be used to introduce hydrophobicity into polyurethane elastomers. This results in improved resistance to hydrolysis over polyether or polyester polyol based polyurethanes. However, the mechanical properties of the resulting polyurethane elastomers are generally rather poor when they are prepared using the conventional diisocyanates and diol chain extenders. In particular, they suffer from poor tear strengths and low elongation at break. This combination of properties limits their utility in applications requiring good resistance to tearing or stretching.

The modest mechanical properties of the polybutadiene containing polyurethane elastomers are probably at least partially due to the high functionality of the commercially available polybutadiene polyols (2.2 to 2.8 functional). In contrast, the polyether or polyester polyols used to make polyurethane elastomers with excellent mechanical properties generally have functionalities very near 2.0.

Hydroxy-terminated polybutadienes having a functionality of 2.0 are disclosed in Chung, et al. (U.S. Pat. No. 5,247,023), Grubbs, et al. (U.S. Pat. No. 5,750,815) and Nubel, et al. (U.S. Pat. Nos. 5,512,635, 5,559,190, 5,519,101 and 5,403,904). These diols, when formulated into polyurethane systems with aliphatic or cycloaliphatic diisocyanates, may offer the opportunity to produce hydrophobic polyurethane elastomers with improved mechanical properties over the current state of the art.

SUMMARY OF THE INVENTION

The present invention relates to a hydrophobic polyurethane elastomer comprising:

A) An isocyanate terminated prepolymer having an isocyanate content ranging from 4 to 12 wt. % NCO comprising the reaction product of:
  i) an OH terminated homopolymer of butadiene having a molecular weight ranging from 1000 to 4000 and an OH functionality of from 1.9 to 2.1;
  ii) an aliphatic or cycloaliphatic diisocyanate.
B) A diol chain extender having a molecular weight ranging from 62 to 400.

In earlier experiments, it was shown that substitution of the dihydroxyl terminated polybutadiene of the type described above for a commercial polybutadiene polyol (Elf Atochem's R-45 HT) in aromatic diisocyanate based prepolymers, followed by chain extension with conventional diol chain extenders like 1,4-butanediol, failed to produce a useable hydrophobic elastomer. Surprisingly, it was determined that with the hydroxy terminated polybutadiene described above, an aliphatic or cycloaliphatic diisocyanate and a diol chain extender, one could produce useable elastomeric materials. In addition, these hydrophobic elastomers were optically clear, light stable and showed dramatic improvement in tear strength and elongation at break over conventional polybutadiene polyol based elastomers.

DETAILED DESCRIPTION OF THE INVENTION

The present invention relates to a light stable hydrophobic polyurethane elastomer prepared by combining an isocyanate terminated prepolymer prepared from an aliphatic or cycloaliphatic diisocyanate and a polybutadiene diol and chain extending the prepolymer with a diol.

The prepolymers of the present invention are prepared from aliphatic or cycloaliphatic diisocyanates and OH terminated homopolymers of butadiene. The prepolymers of the present invention have an NCO content ranging from 4 to 12%, and most preferably 6 to 10%.

In accordance with the present invention, the aliphatic diisocyanate component has an average NCO functionality of about 2. Suitable aliphatic diisocyanates include, for example, 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethyl-cyclohexane (isophorone diisocyanate or IPDI), bis-(4-isocyanato-cyclohexyl)-methane, 2,4'-dicyclohexylmethane diisocyanate, 1,3- and 1,4-bis-(isocyanatomethyl)-cyclohexane, bis-(4-isocyanato-3-methylcyclo-hexyl)-methane, α,α,α',α'-tetramethyl-1,3- and/or -1,4-xylylene diisocyanate, 1-isocyanato-1-methyl-4(3)-isocyanatomethyl cyclohexane, 2,4- and/or 2,6-hexahydrotoluylene diisocyanate, and mixtures thereof. It is preferred that the isocyanate be based on mixtures of the various stereoisomers of bis-(4-isocyanatocyclohexl)-methane including 4,4'-dicyclohexylmethanediisocyanate (rMDI).

In a preferred embodiment, suitable examples of diisocyanates include IPDI or rMDI. In particular, the commercial isomer mixture of rMDI, which typically contains 23% by weight trans,trans, 49% by weight cis,trans, and 28% by weight cis,cis isomer is preferred.

Examples of suitable polyols are OH terminated homopolymers of butadiene having a functionality ranging from 1.9 to 2.1, preferably 1.95 to 2.0 and a molecular weight ranging from 1000 to 4000, preferably 2000 to 2500. Examples of suitable OH terminated homopolymers of butadiene are those described by the general formula given below:

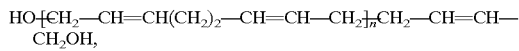

HO—[CH$_2$—CH=CH(CH$_2$)$_2$—CH=CH—CH$_2$]$_n$CH$_2$—CH=CH—CH$_2$OH, wherein n is a number average value from about 8 to 36.

The NCO terminated prepolymer is chain extended with a diol which gives optically clear, elastomeric materials. The diol has a low molecular weight ranging from 62 to 400, preferably ranging from 62 to 150. Examples of suitable diols include those having 2 to 20 carbon atoms, such as, for example, 1,6-hexanediol, 1,8-octanediol, 2,2,4- trimethylpentane 1,3-diol, 2-methyl-1,3-propanediol, ethylene glycol, diethylene glycol, dipropylene glycol and, in particular, 1,4-butanediol. However, diesters of terephthalic acid with glycols having 2 to 4 carbon atoms, such as, for example, terephthalic acid bis(ethylene glycol) or terephthalic acid bis(1,4-butanediol), hydroxyalkylene ethers of hydroquinone, such as, for example, 1,4-di(hydroxyethyl) hydroquinone, ethoxylated bisphenols, (cyclo)aliphatic diamines such as, for example, isophoronediamine, ethylenediamine, 1,2-propylenediamine, 1,3-propylenediamine, N-methylpropylene-1,3-diamine, N,N'-dimethyl ethylenediamine, and aromatic diamines, such as, for example, 2,4-tolylenediamine and 2,6-tolylenediamine, 3,5-diethyl-2,4-tolylenediamine and 3,5-diethyl-2,6-tolylenediamine and primary mono-, di-, tri- or tetra-alkyl-substituted 4,4'-diaminodiphenylmethanes, are, however, also suitable. Mixtures of either the aforementioned diols or diamines may also be used. The preferred chain extender is 1,4-butanediol.

Of course, the prepolymer of the present invention may include catalysts, plasticizers, light stabilizers, and antioxidants.

The elastomers of the present invention can be used for elastomers, gaskets, seals, films, encapsulants, belts, rollers, screens and casters.

The invention is further illustrated but is not intended to be limited by the following examples in which all parts and percentages are by weight unless otherwise specified.

EXAMPLES

Polyol A: A polybutadiene polyol having an OH number of 46 mg KOH/g and a functionality of 2.4 to 2.6. This polyol is available commercially from Elf-Atochem as the Poly bd R-45HT.

Isocyanate A: An isocyanate having a mixture of isomers of 4,4'-dicyclohexylmethanediisocyanate having an isomer ratio of 23% by weight trans,trans, 49% by weight cis,trans, and 28% by weight cis,cis isomer.

Chain Extender: 1,4-butanediol commercially available from Lyondell Chemical Company.

Example 1

Synthesis of Dihydroxyl Terminated Polybutadiene

To a clean, dry, $N_2$ purged reactor was added freshly distilled 1,4-diacetoxy-2-butene (154 g; 0.90 mol). Un-stabilized 99% 1,5-cyclooctadiene (1760 g; 16.3 mol) was added to the reactor and a stream of $N_2$ was allowed to bubble through the reaction mixture for 30 minutes. The catalyst, bis(tricyclohexylphosphine)benzylidene-ruthenium dichloride (3.06 g; 3.7 mmol) was dissolved in a minimal amount of dichloromethane under a nitrogen blanket and added to the reaction mixture. The mixture was heated slowly to 50° C. Cooling was applied as needed to control the temperature of the mildly exothermic reaction. After 8 hours at 50° C., vinyl acetate (0.625 g; 7.3 mmol) was added to the mixture to inactivate the catalyst. The mixture was stirred for an additional hour and then cooled to room temperature. NMR analysis of the crude product indicated >98% conversion of monomer. The crude polymer was poured into a mixture of methanol (6 liter) and 1N hydrochloric acid (500 ml) and stirred for 1 hour to precipitate the polymer. The methanol solution was decanted and the precipitate once again added to a mixture of methanol (6 liter) and hydrochloric acid (1 N; 500 ml) and stirred for 1 hour. The methanol layer was removed and the polymer precipitated from methanol (4 liter) three more times. The polymer was dissolved in tetrahydrofuran (4 liter) and placed into a reactor, which was subsequently cooled to 0° C. Sodium methoxide (809 g; 3.7 mol) was added as a 25 wt. % solution in methanol. The drop-wise addition took place over a 40 minute period, and the mixture was allowed to stir at 0° C. for an additional 5 hours. The reaction mixture was warmed to room temperature and poured into methanol (6 liter). The pH of the methanol was maintained at 4–5 by addition of concentrated HCl as needed. The methanol solution was then decanted and the residual polymer was precipitated once again from a solution of methanol (6 liter) and 1N HCl (500 ml). The polymer precipitate was then washed three times with 6 liters of methanol containing 500 ml of water, followed by two washings with 6 liters of methanol. The methanol layer was removed by decanting. The polymer was further purified by removing excess solvent via vacuum distillation.

Analysis of the resulting dihydroxyfunctional polybutadiene showed it to have an OH # of 52.0 mg KOH/g and a viscosity of 800 mPa.s at 25° C. NMR spectroscopy revealed a broad singlet at 5.4 ppm (vinyl protons), a broad singlet at 2.1 ppm (methylene protons) and two small doublets at 4.15 and 4.05 ppm corresponding to the methylene protons adjacent to the hydroxyl end-groups in the cis and trans configurations.

Example 2

Synthesis of an Isocyanate Terminated Prepolymer from Isocyanate A and the Dihydroxyl Terminated Polybutadiene of Example 1

The polyol from Example 1 (512 g; 0.474 eq.) was added to a 3-necked reactor equipped with overhead stirring, a thermocouple, and a vacuum adapter and heated to 60° C. Isocyanate A (236.1 g; 1.80 eq.) was added to the flask at room temperature, which brought the temperature of the reaction mixture down to ~50° C. A 1 wt. % solution of dibutyltin dilaurate in the polyol from Example 1 was added (1.87 g) to the reactor, and the mixture was heated and stirred under vacuum to 60° C. After about five minutes of stirring, the reaction exotherm brought the temperature up to ~70° C. The mixture was then allowed to cool to 60° C. and held there as it was stirred under vacuum. After an additional 2.5 hours, a sample of the mixture was drawn and titrated for NCO content. The prepolymer had an NCO content of 7.65% NCO.

Example 3

Synthesis of an Isocyanate Terminated Prepolymer from Isocyanate A and Polyol A

Polyol A (819.8 g; 0.672 eq.) was added to a 3-necked reactor equipped with overhead stirring, a thermocouple, and a vacuum adapter and heated to 60° C. Isocyanate A (377.2 g; 2.88 eq.) was added to the reaction flask. A 1 wt. % solution of dibutyltin dilaurate in polyol A was added (3 g) to the reactor, and the mixture was heated and stirred under vacuum to 60° C. After 3 hours total reaction time, a sample of the prepolymer was drawn and titrated for NCO content. The prepolymer had an NCO content of 7.55% NCO.

Example 4 illustrates that a hydrophobic light stable elastomer prepared with a polybutadiene diol according to the invention has significantly better tear resistance and higher elongation at break than one prepared using a conventional polybutadiene polyol (Example 5).

Example 4

Synthesis of a Light Stable Hydrophobic Polyurethane Elastomer—According to the Invention The prepolymer of Example 2 (315 g; 0.574 eq.) was removed from the reaction flask (still at 60° C.) and poured into a disposable can. 1,4-butanediol was pre-heated to 60° C. and the diol (24.6 g; 0.546 eq.) was added to the prepolymer. The mixture was stirred rapidly and the clear liquid was poured into a plaque mold (8"×8"×1/8") that had been pre-heated to 110° C. The elastomer was allowed to cure at 110° C. for 18 hours. The resulting plaque was optically clear, tough and elastic. The mechanical properties of this elastomer are shown in Table 1 below. The elastomer shows significantly improved tear strength and ultimate elongation over the comparative example.

Example 5

Synthesis of a Light Stable Hydrophobic Polyurethane Elastomer—Comparative Example The prepolymer of Example 3 (315 g; 0.566 eq.) was removed from the reaction flask (still at 60° C.) and poured into a disposable can. 1,4-butanediol was pre-heated to 60° C. and the diol (24.3 g; 0.539 eq.) was added to the prepolymer. The mixture was stirred rapidly and the clear liquid was poured into a plaque mold (8"×8"×1/8") that had been pre-heated to 110° C. The elastomer was allowed to cure at 110° C. for 18 hours. The resulting plaque was optically clear, tough and elastic, but did not have the tear resistance of Example 4. The mechanical properties of this elastomer are shown in Table 1 below.

TABLE 1

Mechanical Properties of Hydrophobic Light Stable PU Elastomers.

| Mechanical Property | Example 4 (According to Invention) | Example 5 (Comparative Example) |
|---|---|---|
| Shore A @ 1 sec. | 85 | 87 |
| Shore D @ 1 sec | 35 | 36 |
| Resilience (%) | 59 | 53 |
| Split Tear (avg.) (pli) | 130 | 50 |
| Die C Tear (pli) | 395 | 265 |
| Tensile Strength (psi) | 1575 | 1525 |
| 100% Modulus (psi) | 710 | 910 |
| 300% Modulus (psi) | 1105 | 1520 |
| Ultimate Elongation (%) | 485 | 290 |
| Compression Set (%) | 71 | 70 |
| Appearance | Optically clear | Optically clear |

Example 6

Synthesis of an Aromatic Diisocyanate Based Hydrophobic Polyurethane Elastomer—Comparative Example Diphenylmethane-4,4'-diisocyanate (MDI) was preheated in a vented oven to 60° C. The molten MDI (150 g; 1.20 eq.) was added to a three necked reactor equipped with overhead stirring, a thermocouple, and a vacuum adapter. The polyol from Example 1 (350 g; 0.324 eq.) was added to the reaction flask. The mixture was heated to 80° C. and allowed to stir at that temperature for 3.0 hours. The resulting prepolymer had an NCO content of 6.93% as determined by standard n-butylamine titration.

The prepolymer described above (49.5 g; 0.0817 eq.) was removed from the reaction flask (still at 80° C.) and poured into a disposable can. A small sample vial containing 1,4-butanediol was pre-heated to 60° C. and a sample of the 1,4-butanediol (3.50 g; 0.0778 eq.) was added to the prepolymer. The mixture was stirred rapidly and the milky liquid was poured into a plaque mold (4"×4"×1/8") that had been pre-heated to 110° C. After 3 hours, the plaque was too soft and cheesy to be removed from the mold. The plaque was allowed to cure in the mold at 110° C. for 18 hours. The resulting plaque was opaque, cheesy, and it broke into pieces when flexed by hand.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A light stable hydrophobic polyurethane elastomer comprising the reaction product of:
   A) an isocyanate terminated prepolymer having an isocyanate content ranging from 4 to 12 wt. % NCO comprising the reaction product of:
      i) an OH terminated homopolymer of butadiene having a molecular weight ranging from 1000 to 4000 and an OH functionality of from 1.9 to 2.1, prepared in the presence of bis(tricyclohexylphosphine) benzylidene-ruthenium dichloride catalyst; and
      ii) 4,4'-dicyclohexyl-methanediisocyanate containing about 23% by weight trans,trans, 49% by weight cis,trans, and 28% by weight cis,cis isomer;
   B) at least one symmetric diol or diamine chain extender having a molecular weight ranging from 62 to 400.

2. The elastomer according to claim 1, wherein the OH terminated homopolymer of butadiene has an OH functionality ranging from 1.95 to 2.0.

3. The elastomer according to claim 1 wherein said homopolymer of butadiene is dihydroxyl terminated polybutadiene.

4. The elastomer according to claim 1, wherein the OH terminated homopolymer of butadiene is represented by the formula:

$$HO\text{-}[CH_2\text{---}CH\text{=}CH(CH_2)_2\text{---}CH\text{=}CH\text{---}CH_2]_n CH_2\text{---}CH\text{=}CH\text{---}CH_2OH,$$

wherein n is a number average value from about 8 to 36.

5. The elastomer according to claim 1, wherein said at least one symmetric diol or diamine chain extender is selected from the group consisting of 1,6-hexane-diol, 1,8-octanediol, 2-methyl-1,3-propanediol, ethylene glycol, diethylene glycol, dipropylene glycol, 1,4-butanediol, terephthalic acid bis(ethylene glycol), terephthalic acid bis (1,4-butanediol), 1,4-di(hydroxyethyl)hydroquinone, ethylenediamine, 1,3-propylenediamine, N-methylpropylene-1,3-diamine, N,N'-dimethyl ethylenediamine, 2,6-tolylenediamine and 3,5-diethyl-2,6-tolylenediamine.

6. The elastomer according to claim 5, wherein said at least one symmetric diol or diamine chain extender is 1,4-butanediol.

7. A light stable hydrophobic polyurethane elastomer comprising the reaction product of:
   A) an isocyanate terminated prepolymer having an isocyanate content ranging from 4 to 12 wt. % NCO comprising the reaction product of i) an OH terminated homopolymer of butadiene having a molecular weight ranging from 1000 to 4000 and an OH functionality of from 1.9 to 2.1, prepared. In the presence of bis(tricyclohexylphosphine) benzylidene-ruthenium dichloride catalyst, and ii) 4,4'-dicyclohexyl-methanediisocyanate containing about 23% by weight trans,trans, 49% by weight cis,trans, and 28% by weight cis,cis isomer; and B) 1,4-butanediol.

8. A process for preparing a light stable hydrophobic polyurethane elastomer comprising:

A) forming a polyurethane reactive mixture by reacting i) an isocyanate terminated prepolymer having an isocyanate content ranging from 4 to 12 wt. % NCO comprising the reaction product of:

a) an OH terminated homopolymer of butadiene having a molecular weight ranging from 1000 to 4000 and an OH functionality of from 1.9 to 2.1, prepared in the presence of bis(tricyclohexylphosphine)benzylidene-ruthenium dichloride catalyst, and b) 4,4'-dicyclohexyl-methanediisocyanate containing about 23% by weight trans,trans, 49% by weight cis,trans, and 28% by weight cis,cis isomer; with ii) at least one symmetric diol or diamine chain extender having a molecular weight ranging from 62 to 400; and B) curing the reactive mixture in a mold.

9. A process for preparing a light stable hydrophobic polyurethane elastomer comprising:

A) forming a polyurethane reactive mixture by reacting:

i) an isocyanate terminated prepolymer having an isocyanate content ranging from 4 to 12 wt. % NCO comprising the reaction product of a) an OH terminated homopolymer of butadiene having a molecular weight ranging from 1000 to 4000 and an OH functionality of from 1.9 to 2.1, prepared in the presence of bis(tricyclohexylphosphine)benzylidene-ruthenium dichloride catalyst, and b) 4,4'-dicyclohexyl-methanediisocyanate containing about 23% by weight trans,trans, 49% by weight cis,trans, and 28% by weight cis,cis isomer; with ii) 1,4-butanediol; and B) curing the reactive mixture in a mold.

10. A light stable hydrophobic polyurethane elastomer comprising the reaction product of:

A) an isocyanate terminated prepolymer having an isocyanate content ranging from 4 to 12 wt. % NCO comprising the reaction product of:

i) an OH terminated homopolymer of butadiene having a molecular weight ranging from 1000 to 4000 and an OH functionality of from 1.9 to 2.1, prepared in the presence of bis(tricyclohexylphosphine) benzylidene-ruthenium dichloride catalyst; and ii) 4,4'-dicyclohexyl-methanediisocyanate containing about 23% by weight trans,trans, 49% by weight cis,trans, and 28% by weight cis,cis isomer; and B) at least one chain extender chosen from 1,6-hexanediol, 1,8-octanediol, 2-methyl-1,3-propanediol, ethylene glycol, diethylene glycol, dipropylene glycol, 1,4-butanediol, terephthalic acid bis(ethylene glycol), terephthalic acid bis(1,4-butanediol), 1,4-di (hydroxyethyl) hydroquinone, ethylenediamine, 1,3-propylenediamine, N-methylpropylene-1,3-diamine, N,N'-dimethyl ethylenediamine, 2,6-tolylenediamine or 3,5-diethyl-2,6-tolylenediamine.

11. The elastomer according to claim 10, wherein said homopolymer of butadiene is dihydroxyl terminated polybutadiene.

12. The elastomer according to claim 10, wherein the OH terminated homopolymer of butadiene is represented by the formula:

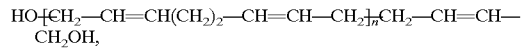

wherein n is a number average value from about 8 to 36.

* * * * *